Patented Apr. 9, 1940

2,196,452

UNITED STATES PATENT OFFICE 2,196,452

PRODUCTION OF CONDENSATION PRODUCTS OF VINYL METHYL KETONE AND WATER-SOLUBLE ALDEHYDES

Heinrich Hopff, Ludwigshafen-on-the-Rhine, Germany, assignor to I. G. Farbenindustrie Aktiengesellschaft, Frankfort - on - the - Main, Germany No Drawing. Application August 13, 1937, Serial No. 158,862. In Germany August 15, 1936

2 Claims. (Cl. 260—63)

The present invention relates to condensation products of vinyl methyl ketone and water-soluble aldehydes and to a process of producing the same.

I have found that methyl vinyl ketone can be condensed in a slightly acid or neutral medium with water-soluble aldehydes, such as for example formaldehyde or substances which act as formaldehyde, as for example paraformaldehyde, hexamethylene tetramine, methylal, methylol compounds of acid amides or phenols, as for example dimethylol urea, para-cresol di-carbinol, acetaldehyde, para-acetaldehyde, propionaldehyde or furfurol to form water-soluble compounds which are converted by treatment with substances having a strongly basic reaction into solid resinous masses. If the condensation is carried out in a strongly basic medium the said solid resinous condensation products are obtained immediately.

The condensation of the methyl vinyl ketone with water-soluble aldehydes or substances acting as such aldehydes is preferably carried out with a slightly acid or neutral reaction at ordinary or slightly elevated temperature in water or inert water-soluble solvents. In this way, with a slight increase in temperature, there is obtained a slightly viscous solution which may be converted into a thick syrup by evaporating the solvent. By adding small amounts of substances having a strongly basic reaction, as for example sodium, potassium, calcium or barium hydroxide solution, or strong organic bases, as for example methyl amine, ethylene diamine, tetramethyl-ammonium hydroxide, piperidine, ethanol amines, benzyl amine or cyclohexylamine, the condensation product solidifies in a few minutes with a marked increase in temperature to form a pale yellow colored hard resin. This is insoluble in most organic solvents and is infusible in the condensed-out form. It may be worked up with advantage into high quality electrical pressed masses, preferably in combination with fillers and dyestuffs.

In the water-soluble form, the product may also be used with advantage as an adhesive, for example for gluing veneer wood. For this purpose dilute caustic soda solution is added to the syrupy solution of the condensation product, the solution is brushed on the surfaces to be united and the whole is pressed together under gentle pressure.

By adding substances which also yield resinous products with formaldehyde under the reaction conditions, as for example phenols, amines, urea or cyanamide, at any stage of the reaction, the properties of the final products may be varied within wide limits.

The following examples will further illustrate the nature of this invention but the invention is not restricted to these examples. The parts are by weight.

Example 1

72 parts of methyl vinyl ketone are allowed to drop while stirring at a temperature below 50° C. into 150 parts of 30 per cent formaldehyde which has been practically neutralized by the addition of about 0.5 part of concentrated sodium hydroxide solution. The resulting solution is condensed to a viscous syrup by gentle heating. By adding a few drops of concentrated sodium hydroxide solution a solidification of the condensation product to form a yellowish resin takes place with a strong increase in temperature.

The solution of the condensation product, after regulation to a slightly alkaline reaction, may also be brushed on a thin sheet of plywood onto which a second sheet of plywood is then pressed at about 100° C. in a hydraulic press. An excellent waterproof union for the two sheets of plywood is thus obtained.

The solution may also be kneaded with an equal amount of wood meal, the resulting mass carefully dehydrated and then pressed in a pressure mould at 100° C. for about 5 minutes. Shaped articles having a beautiful smooth surface and good mechanical properties are thus obtained.

Example 2

144 parts of methyl vinyl ketone are allowed to drop at ordinary temperature while stirring into a solution of 100 parts of acetaldehyde in 200 parts of water, which was neutralized by the addition of about 3 parts of a 10-normal sodium hydroxide solution. Reaction takes place with the evolution of heat. The reaction temperature is kept below 50° C. by cooling. A viscous solution is thus obtained, which may be concentrated to form a thick, sticky syrup. By the addition of a strongly basic substance, as for example, sodium hydroxide solution, the condensation product obtained is converted into a solid, pale resin with a strong increase in temperature.

What I claim is:

1. A process of producing condensation products which comprises condensing monomeric vinyl methyl ketone with aqueous formaldehyde in a from neutral to slightly acid medium.

2. A process of producing condensation products which comprises condensing monomeric vinyl methyl ketone with aqueous formaldehyde in a from neutral to slightly acid medium and treating the water-soluble condensation product obtained with a substance having a strongly basic action.

HEINRICH HOPFF.